April 1, 1952  A. J. SWANSON  2,591,476
HINGED CLOSURE CONTROL
Filed Oct. 9, 1945  3 Sheets-Sheet 1
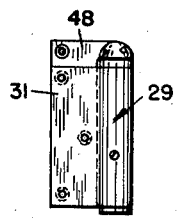
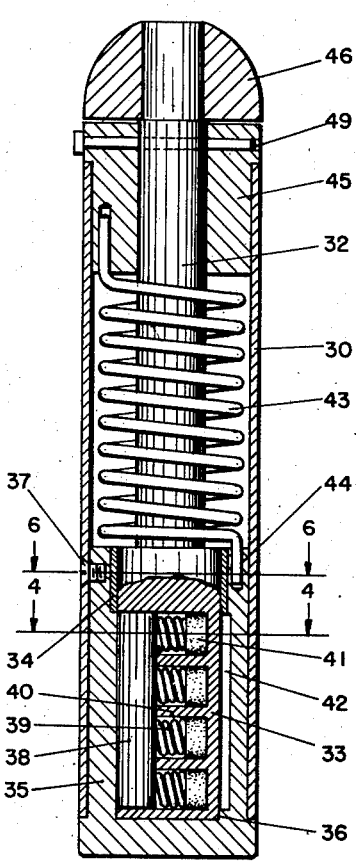
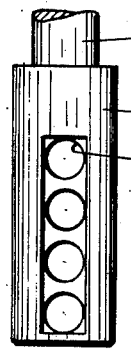
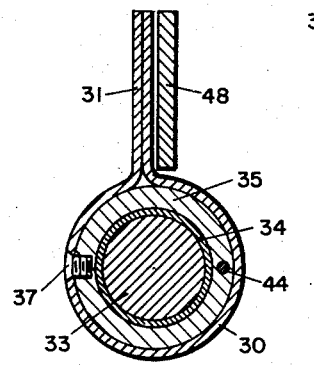
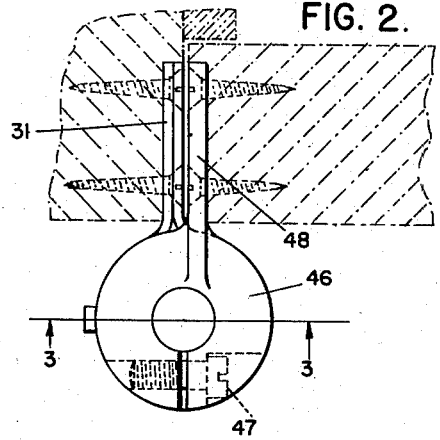
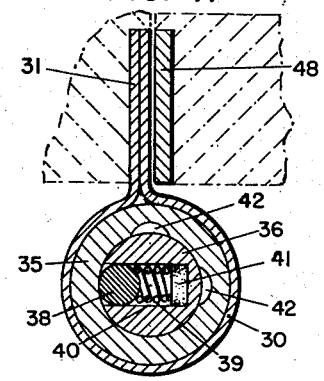
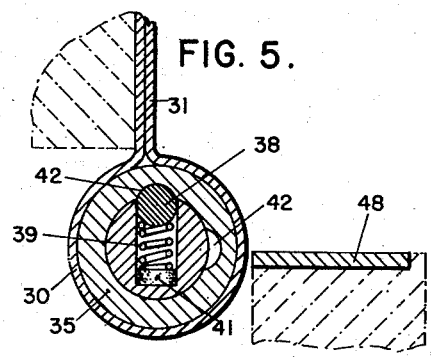
INVENTOR
ALFRED J. SWANSON
BY
ATTORNEY April 1, 1952
A. J. SWANSON
2,591,476
HINGED CLOSURE CONTROL
Filed Oct. 9, 1945
3 Sheets-Sheet 2
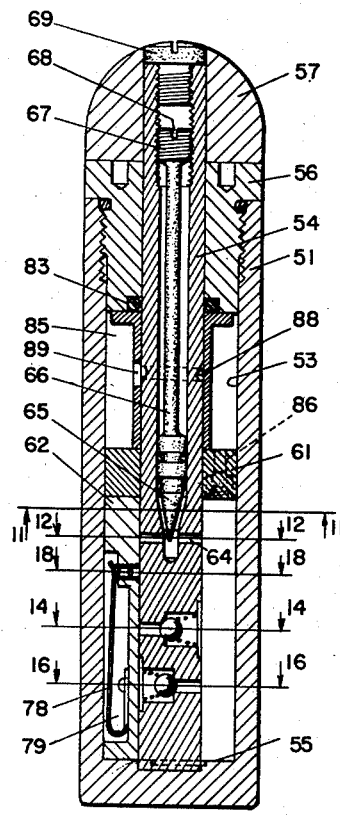
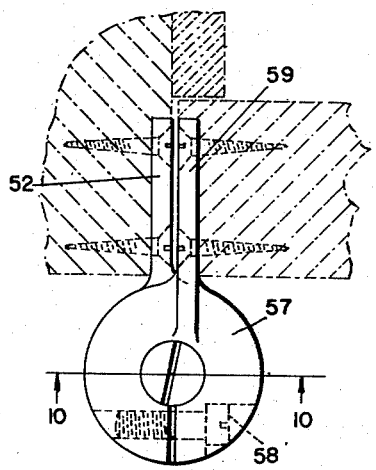
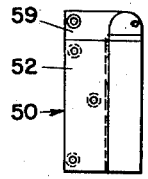
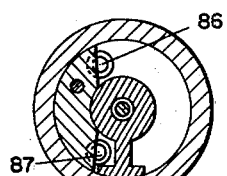
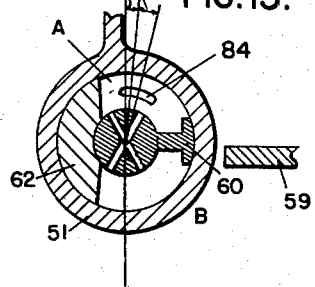
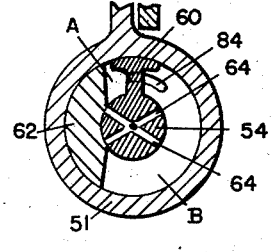
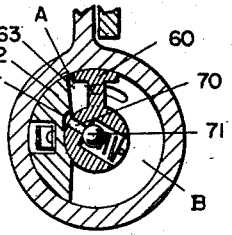
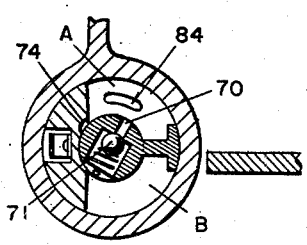
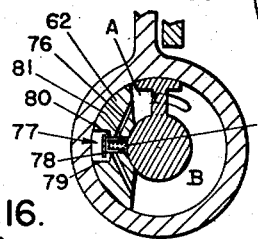
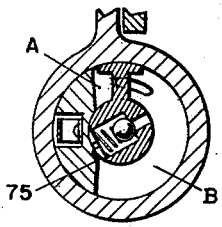
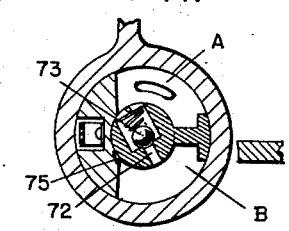
INVENTOR
ALFRED J. SWANSON
BY
ATTORNEY April 1, 1952     A. J. SWANSON     2,591,476
HINGED CLOSURE CONTROL Filed Oct. 9, 1945     3 Sheets-Sheet 3

INVENTOR
ALFRED J. SWANSON
BY
ATTORNEY

Patented Apr. 1, 1952

2,591,476

UNITED STATES PATENT OFFICE 2,591,476

HINGED CLOSURE CONTROL

Alfred J. Swanson, Hollywood, Calif.

Application October 9, 1945, Serial No. 621,185

3 Claims. (Cl. 16—54)

This invention relates to a hinged closure control device, and in particular to a device for hingedly mounting and controlling a door.

One object of my invention is to provide a hinged closure controlling device embodying an actuating supporting hinge unit and a hinged checking unit which when used together on a door, coact to hingedly mount the door and to control the movement of the door so that it may be opened with little effort, following which it will smoothly, silently and automatically close when released. Another object of the invention is to provide a closure controlling device in which the hydraulic controlling mechanism is arranged in a separate non-load bearing hinged unit. A still further object of the invention is to provide a hinge having hydraulic control means. Other objects are to provide hinge means for a hand operated door which controls the rates of movement of the door in any part of its movement in either direction; to provide a hydraulically controlled hinge which offers little or no resistance to its movement in either direction throughout most of its travel, but whose movement at the ends of travel are hydraulically controlled; to provide a non-leaking hydraulic control hinge which may be used for long periods of time without adjustment or servicing. These and other objects are attained by my invention which will be understood from the following description reference being made to the accompanying drawings in which:

Fig. 1 is a front elevation of a weight-supporting power hinge;

Fig. 2 is a top elevational view of the same;

Fig. 3 is a cross-sectional view taken on the line 3—3 of Fig. 2;

Fig. 4 is a cross-sectional view taken on the line 4—4 of Fig. 3 with the hinge in the closed position;

Fig. 5 is a cross-sectional view similar to Fig. 4 with the hinge opened to 90°;

Fig. 6 is a cross-sectional view taken on the line 6—6 of Fig. 3;

Fig. 7 is a fragmentary side elevational view of the lower part of the shaft shown in Fig. 3 at right angles to the position shown in Fig. 3;

Fig. 8 is a side elevational view of the non-load bearing hydraulic control hinge of my invention;

Fig. 9 is a top elevational view of the same;

Fig. 10 is a cross-sectional view taken on the line 10—10 of Fig. 9;

Fig. 11 is a cross-sectional view taken on the line 11—11 of Fig. 10;

Fig. 12 is a cross-sectional view taken on the line 12—12 of Fig. 10;

Fig. 13 is a cross-sectional view similar to Fig. 12 with the hinge opened 90° from the position shown in Fig. 12;

Fig. 14 is a cross-sectional view taken on the line 14—14 of Fig. 10;

Fig. 15 is a cross-sectional view similar to Fig. 14 with the hinge opened 90° from the position shown in Fig. 14;

Fig. 16 is a cross-sectional view taken on the line 16—16 of Fig. 10;

Fig. 17 is a cross-sectional view similar to Fig. 16 with the hinge opened 90° from the position shown in Fig. 16;

Fig. 18 is a cross-sectional view taken on the line 18—18 of Fig. 10;

Figure 19:
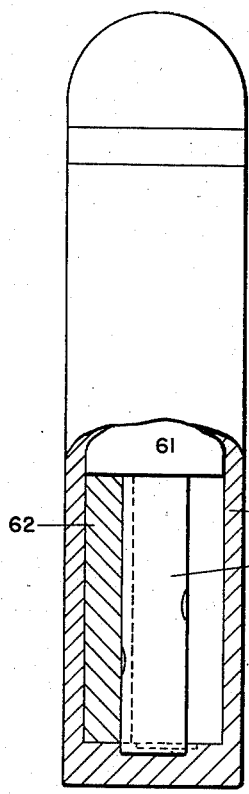
Fig. 19 is a side elevational view partly in section showing an alternative arrangement of the hydraulic control device shown in Fig. 10.

Referring to the drawings, particularly Figs. 1 to 7, and 22, the load-bearing power hinge 29 consists of a casing 30 having a cylindrical cavity and an attached hinge leaf 31, a shaft 32 having an enlarged lower portion 33 adapted to turn in a sleeve bearing 34 held in an intermediate position, in the upper part of the bottom block 35 which has a cylindrical cavity 36 serving as a thrust bearing for the enlarged lower end 33 of the shaft 32. The bottom block 35 is attached to the casing 30 by suitable means, for example, by the set screw 37. The enlarged lower portion 33 of the shaft 32 is slotted vertically to receive the detent roller 38 which is pushed outwardly by small coil springs 39 set in holes 40 drilled at right angles to the axis of the roller 38 and the axis of the shaft 32, these holes (4 being shown) being drilled only part way through the shaft so that the ends of the springs 39 abut the closed end of the hole. Between the bottom of the hole and the spring may be inserted plugs 41 of fusible alloy metal such as, for example, Wood's metal, which if the temperature rises above a selected point, will melt and relieve the pressure of the springs 39 against the detent roller 38. The detent roller 38 is adapted to movably hold the shaft in selected angular positions, by catching in the vertical slots 42 which are provided in the cylindrical cavity 36 of the bottom block 35. A coiled power spring 43 is anchored at the lower end in the hole 44 in the bottom block 35, and is anchored at the other end in the top block 45 which is non-rotatably attached to the upper end of the shaft 32. The upper end of the shaft 32 is serrated and non-rotatably attached to the split cap 46 by the clamp screw 47 securing the ends of the cap 46 together. The hinge leaf 48 is made integrally with or attached to the cap 46. A radial hole 49 is provided in the top block 45 for the insertion of a suitable pin for the purpose of removal of the block 45 when installing a spring of different strength as required for adjusting the tension of the power spring 43. The strength of the spring 43 is selected to fit the particular conditions of weight, friction, speed of closing, etc., and suitable for coaction with the hinged control device 50.

The hydraulic control hinge in its preferred form is shown in Figs. 8 to 18 and 22. In these figures, the control hinge 50 consists of a cylindrical casing 51 provided with a hinge leaf 52, the casing 51 having a cylindrical cavity 53. A shaft 54 is pivoted in the bottom 55 of the cavity 53 and extends upwardly through the screw plug 56 which is threaded into the upper end of the cylindrical casing 51. There is substantially no down thrust by the lower end of the shaft 54 in the cavity 53 when the power hinge is adjusted to support the entire weight of the door on the bearing 36. The shaft 54 extends above the end of the screw plug 56 and is attached to the split cap 57 by the clamp screw 58 securing the ends of the cap 57 together. The hinge leaf 59 is attached or integral with the cap 57. The shaft 54 is provided with a rotary piston 60 which extends from the bottom 55 of the cylindrical casing 51 to the partition member 61 which is disposed about midway the ends of the shaft. A fixed member or dam 62 is provided adjacent the rotary piston to define the working chamber 63 for hydraulic fluid. A control by-pass for hydraulic fluid is provided by the holes 64 passing from one side of the piston 60 to the other through the axis of the shaft 54. At the intersection of the two holes 64, a needle valve 65 having a stem 66 extends upwardly through a hole in the center of the shaft to a threaded head 67 which is accessible for adjustment by means of the slot 68 upon removal of the closing screw 69. Two other holes are drilled across the shaft from one side of the piston to the other, to provide one-way movement of the hydraulic fluid from one side of the piston 60 to the other, the hole 70 being provided with the check valve 71 allowing the fluid to move unrestricted from the A working chamber on one side of the piston to the B working chamber on the other side of the piston, and the hole 72 being provided with a check valve 73 allowing fluid to flow unrestrictedly from the B side of the piston to the A side. These holes 70 and 72 are so placed that as the piston approaches the end of its movement toward the dam 62 in the working chamber A, the outlet of the hole 70 is gradually decreased by the dam 62, there being provided a tapered slot 74 in the dam adjacent the opening of the hole 70. Likewise the hole 72 as it approaches the end of its travel toward the dam 62 in the working chamber B is gradually decreased by the dam 62, there being provided a tapered slot 75 coinciding with the hole in the piston shaft. The effect of these check-valved passages through the shaft from the working chamber A to the working chamber B is to permit free passage of the hydraulic liquid from one side to the other in the desired positions of the piston. As shown, when the piston approaches the end of its movement in either direction, the free flow of fluid is gradually cut off by the tapered slots 74 or 75 depending upon whether the piston is moving to the end of the working chamber A or the working chamber B, and the holes 70 and 72 are so disposed angularly that this results in a decelerating action to the movement of the hinge at the desired angular positions.

Figure 23:
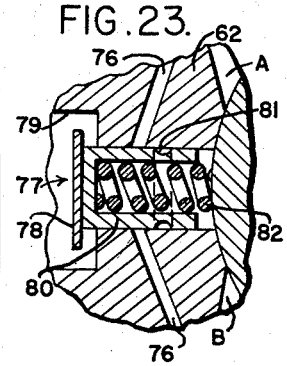
Figure 23 is an enlarged fragmentary view of the thermostat operated valve shown in Figure 18.

In addition to the valved by-pass 64, there may be provided an auxiliary by-pass which is actuated by a temperature responsive arrangement to compensate for the change in viscosity of the hydraulic fluid. A by-pass duct 76 through the dam 62 leading from the working chamber A to the working chamber B is controlled by the valve 77 actuated by the U-shaped bi-metallic thermostat member 78 which is attached to the dam 62 in a cavity 79, the valve itself consisting of an inverted cup 80 having a groove 81 around its circumference near the open end coacting with the adjacent opening of the duct 76, a coil spring 82 inside the cup tending to press the closed end of the cup against the end of the U-shaped bi-metallic thermostat member 78. When the temperature decreases, the viscosity of the fluid becomes greater, and the auxiliary valve 77 operated by the thermostat 78 is opened to a greater extent, and when the temperature increases, the thermostat member causes the passage through the valve 77 to be constricted by moving the circumferential groove 81 therein out of register with the opening of the duct 76 as shown in Fig. 23, thus compensating for the lower viscosity of the hydraulic fluid.

Between the partition member 61 and the top screw plug 56 is provided a reserve reservoir 85 for the hydraulic fluid. Replenishment of fluid to the working chamber on both sides of the piston is provided by means of the check valves 86 and 87 which permit flow to the working chambers only. Leakage of fluid around the shaft 54, if any, is collected in the groove 88 which discharges through the opening 89 in the extension of the partition member 61 surrounding the shaft into the reservoir 85. A sealing ring 83 is provided around the shaft above the groove 88 in order to prevent any leakage of fluid out of the top of the hinge. The provision of an ample supply of reserve fluid in the reservoir 85, under ordinary pressure, is important in keeping the hydraulic working chamber entirely free from gas. When suction is produced within the hydraulic unit by the movement of the piston, the replenishing liquid is drawn into the working chamber, and this prevents the drawing in of air, which usually occurs when ample reserve liquid is not available through check-valved ports. The presence of only a little air in the working chamber prevents its proper functioning.

In the use of the hydraulic hinge for controlling the movement of a door having a latch, it is desirable to interrupt the deceleration or slowing down action for a short interval immediately before the door comes to the completely closed position. To provide for this, a relief slot 84 may be provided in the bottom surface of the working chamber, this slot being positioned so that the hydraulic fluid may by-pass under the piston, at the exact point where slight acceleration in the movement of it is desired in order to overcome the resistance of the spring latch going into the latch hole. It is obvious that this by-pass relief slot 84 may be positioned in any desired place in the bottom surface of the working chamber contacting the surface of the piston, as shown, (see Fig. 13). The relief of the hydraulic checking starts at 8° from the closed position and ends at 3° from the completely closed position, this relief of the checking action giving sufficient acceleration to the door to cause the latch to operate quietly, and without slamming of the door.

In Fig. 19 is shown the same arrangement of the hydraulic hinge as that of Fig. 10 with the exception that the thermostat controlled by-pass is omitted. The thermostat arrangement is useful in installations in which extreme ranges of temperatures are encountered but may be omitted in interior installations where the temperature range is not great and the change in viscosity of the fluid does not appreciably or objectionably effect the control of the movement of the door. The similar parts in Fig. 19 are numbered as in Figs. 8 to 18.

Figure 20:
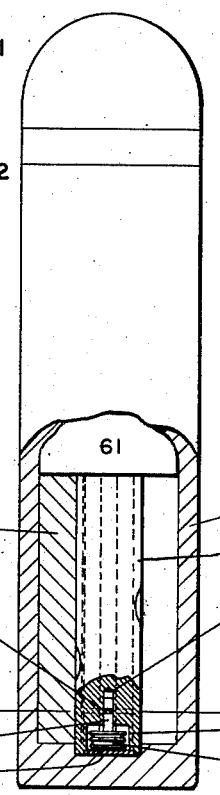
Fig. 20 is a side elevational view partly in section showing another alternative form of the hydraulic control hinge similar to Fig. 10.
Figure 22:
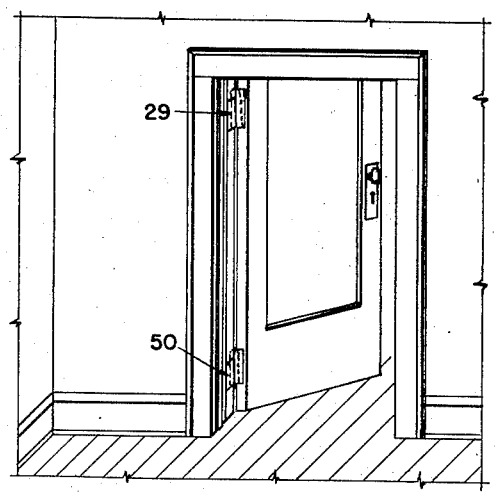
Fig. 22 is a perspective view showing the mounting of a hand operated door in a door casing in combination with a hydraulic control hinge and a load-bearing power hinge of my invention.
Figure 21:
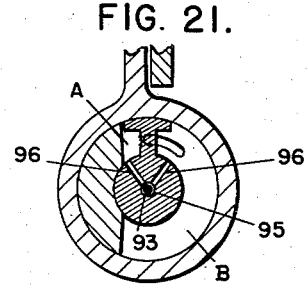
Fig. 21 is a cross-sectional view taken on the line 21—21 of Fig. 20.

In Figs. 20 and 21 is shown an alternative arrangement for compensating for the change in viscosity of the fluid with extreme changes in temperature. This consists in providing a Sylphon bellows 90 in a cavity 91 in the lower end of the shaft 54, the Sylphon being held in place by a pressed-in cap 92 closing the cavity 91. The inner wall of the bellows is attached to a stem 93 which fits closely in the hole 94 in the shaft 54 and is provided with a groove 95 which coincides with by-pass holes 96 through the shaft leading from the working chamber A to the working chamber B. The bellows 90 is filled with a condensible gas which liquifies at some selected critical temperature, for example 90° F. If the temperature is 90° or below, the Sylphon contracts and the valve stem 93 is moved to a position allowing the fluid to by-pass from one working chamber to the other through the open valve. If the temperature rises above 90°, the liquid inside the bellows changes to a gas and the bellows expands, closing the valve by the upward movement of the stem 93 to put the groove 95 out of register with the by-pass holes 96. It has been found that this single step compensation for the temperature change in viscosity of the fluid in the hydraulic checking mechanism gives satisfactory results in actual practice so that it is unnecessary to use a constantly changing opening in the valve for all changes in temperature. The action of the Sylphon operated valve, utilizing the condensible liquid, is positive in action, and permits the precise adjustment of the valve so that it is completely opened or completely closed.

By using the combination of the power hinge carrying the weight of the door in combination with another hinging unit coacting to hold the door in hinged relation to the door-opening but carrying none of the weight of the door, allows the use of the precision hydraulic mechanism of my control hinge for long periods of time, without the requirement of servicing or adjustment. The hinges may be adjusted upon loosening the clamp screws 47 and 58 and by the placing of the leaves on the door or door jamb so that the weight of the door may be shifted to the power hinge which is particularly adapted to carry a load. The hydraulic hinge, with its precision construction is protected from wear in the hydraulic surfaces by shifting the load to the power hinge. The provision of fusible metal plugs behind the springs actuating the detent mechanism in the power hinge permits the use of my invention for mounting fire-doors since, in the event of fire, the release of the detent springs by the melting of the plugs releases and automatically closes the door. Since a door is always mounted with a minimum of two hinges, it is possible to provide the control hinge and the power hinge of similar outside ornamental design and of inconspicuous proportions so that door control in homes and other places where only conspicuous accessory closers have been available, is now possible by the use of my invention.

I claim:

1. In a hinged door and doorframe assembly, a door arranged to hingedly swing from one of its vertical edges in a doorframe, a power hinge and a checking hinge mounting said door, each of said hinges having a hinge pin, a casing, and two leaves, one leaf being vertically adjustable on its hinge pin and means for holding the leaf in its adjusted position, the other leaf being connected to the casing, said casing being concentric with said hinge pin, said power hinge pin having a thrust bearing on said casing, the hinge pin leaf of both hinges being attached to one member of the hinged door and doorframe assembly, and the casing leaf of both hinges being attached to the other member of the hinged door and doorframe assembly; the fastening of the hinge-pin leaf to the hinge pin in said power hinge being so arranged and adjusted that all of the weight of said door is carried as a thrust load on the said thrust bearing between said hinge pin and said casing; and in said checking hinge the fastening of the hinge-pin leaf to the hinge pin being adjusted so that little or no weight thrust of the door is carried by the moving parts of said hinge.

2. In a hinged door and doorframe assembly, a door arranged to hingedly swing from one of its vertical edges in a doorframe, a power hinge and a checking hinge mounting said door, each of said hinges having a hinge pin, a casing, and two leaves, one leaf being vertically adjustable on its hinge pin and means for holding the leaf in its adjusted position, said casing being concentric with said hinge pin, said power hinge pin having a thrust bearing on said casing, the hinge pin leaf of both hinges being attached to one member of the hinged door and doorframe assembly and the casing leaf of both hinges being attached to the other member of the hinged door and doorframe assembly; the fastening of the hinge-pin leaf to the hinge pin in said power hinge being so arranged and adjusted that all of the weight of said door is carried as a thrust load on the said thrust bearing between said power hinge pin and said casing; and in said checking hinge the fastening of the hinge-pin leaf to the hinge pin being adjusted so that little or no weight thrust of the door is carried by the moving parts of said checking hinge; said checking hinge having an hydraulic piston means within its casing adapted to check the relative rotary movement between the hinge pin and the casing; and said power hinge having means within its casing adapted to hingedly turn said door in one direction.

3. In a hinged door and doorframe assembly, a door arranged to hingedly swing from one of its vertical edges in a doorframe, a power hinge and a checking hinge mounting said door, each of said hinges having a hinge pin, a casing, and two leaves, one leaf being vertically adjustable on its hinge pin and means for holding the leaf in its adjusted position, the other leaf being fixedly attached to said hinge casing, said casing being concentric with said hinge pin, said power hinge pin having a thrust bearing on said casing, the hinge pin leaf of both hinges being attached to one member of the hinged door and doorframe assembly, and the casing leaf of both hinges being attached to the other member of the hinged door and doorframe assembly; the fastening of the hinge-pin leaf to the hinge pin in said power hinge being so arranged and adjusted that all of the weight of said door is carried as a thrust load on the said bearing between said power hinge pin and said casing; and in said checking hinge the fastening of the hinge-pin leaf to the hinge pin being adjusted so that little or no weight thrust of the door is carried by the moving parts of said hinge; said checking hinge having an hydraulic piston means within its casing to check the relative rotary movement between the hinge pin and the casing; and said power hinge having means within its casing adapted to hingedly turn said door in one direction.

ALFRED J. SWANSON.

REFERENCES CITED

The following references are of record in the file of this patent:

UNITED STATES PATENTS

| Number | Name | Date |
|---|---|---|
| 496,926 | White | May 9, 1893 |
| 902,730 | Hill | Nov. 3, 1908 |
| 969,926 | Wightman | Sept. 13, 1910 |
| 1,241,084 | Bommer | Sept. 25, 1917 |
| 1,526,422 | Hurd | Feb. 17, 1925 |
| 1,621,774 | Fitzgerald | Mar. 22, 1927 |
| 1,686,381 | Jenney | Oct. 2, 1928 |
| 1,701,022 | Thornton | Feb. 5, 1929 |
| 2,072,094 | Bommer | Mar. 2, 1937 |
| 2,103,660 | Bommer | Dec. 28, 1937 |
| 2,166,651 | Wennmann | July 18, 1939 |
| 2,184,607 | Swanson | Dec. 26, 1939 |
| 2,200,865 | Stannard | May 14, 1940 |
| 2,230,661 | Wennmann | Feb. 4, 1941 |
| 2,434,524 | Swanson | Jan. 13, 1948 |